(12) United States Patent
Hornung et al.

(10) Patent No.: US 11,512,940 B2
(45) Date of Patent: Nov. 29, 2022

(54) 3D SENSOR AND METHOD OF MONITORING A MONITORED ZONE

(71) Applicant: SICK AG, Waldkirch (DE)

(72) Inventors: Armin Hornung, Waldkirch (DE); Matthias Neubauer, Waldkirch (DE); Lars Müller, Waldkirch (DE)

(73) Assignee: SICK AG, Waldkirch (DE)

( * ) Notice: Subject to any disclaimer, the term of this patent is extended or adjusted under 35 U.S.C. 154(b) by 808 days.

(21) Appl. No.: 16/502,335

(22) Filed: Jul. 3, 2019

(65) Prior Publication Data

US 2020/0011656 A1    Jan. 9, 2020

(30) Foreign Application Priority Data

Jul. 6, 2018    (DE) .................... 102018116371.1

(51) Int. Cl.
*G01B 11/14*    (2006.01)
*G06T 7/521*    (2017.01)
(Continued)

(52) U.S. Cl.
CPC .............. *G01B 11/14* (2013.01); *F16P 3/142* (2013.01); *G01B 11/22* (2013.01); *G01V 8/10* (2013.01);
(Continued)

(58) Field of Classification Search
CPC ......... F16P 3/142; F16P 3/144; G01B 11/002; G01B 11/02; G01B 11/026; G01B 11/14; G01B 11/22; G01B 11/24; G01B 11/245; G01B 11/25; G01B 11/28; G01B 11/285; G01B 11/30; G01B 11/303; G01B 11/306;
(Continued)

(56) References Cited

U.S. PATENT DOCUMENTS 5,673,082 A * 9/1997 Wells ..................... G06T 7/521
                                                          348/E13.005
9,256,944 B2 * 2/2016 Galera ................... G06V 20/64
(Continued)

FOREIGN PATENT DOCUMENTS

DE     10310768 A1    10/2003
EP      2275990 A1     1/2011
EP      2386876 A1    11/2011

OTHER PUBLICATIONS

Borgefors, "Distance Transformations in Digital Images", Computer Vision, Graphics and Image Processing, vol. 34, pp. 344-371, 1986.
(Continued)

*Primary Examiner* — Gordon J Stock, Jr.
(74) *Attorney, Agent, or Firm* — Nath, Goldberg & Meyer; Jerald L. Meyer; Stanley N. Protigal

(57) ABSTRACT

A 3D sensor for monitoring a monitored zone is provided, wherein the 3D sensor has at least one light receiver for generating a received signal from received light from the monitored zone and has a control and evaluation unit that is configured to detect objects in the monitored zone by evaluating the received signal and to determine the shortest distance of the detected objects from at least one reference volume, and to read at least one distance calculated in advance from the reference value from a memory for the determination of the respective shortest distance of a detected object.

20 Claims, 4 Drawing Sheets

(51) Int. Cl.
    *G06T 7/593*     (2017.01)
    *H04N 13/254*     (2018.01)
    *H04N 13/271*     (2018.01)
    *H04N 13/239*     (2018.01)
    *G01B 11/22*     (2006.01)
    *G01V 8/10*     (2006.01)
    *F16P 3/14*     (2006.01)
    *H04N 13/00*     (2018.01)
    *G05B 19/406*     (2006.01)

(52) U.S. Cl.
    CPC .............. *G06T 7/521* (2017.01); *G06T 7/593* (2017.01); *H04N 13/239* (2018.05); *H04N 13/254* (2018.05); *H04N 13/271* (2018.05); *G05B 19/406* (2013.01); *G05B 2219/34404* (2013.01); *G05B 2219/37492* (2013.01); *G06T 2207/10028* (2013.01); *H04N 2013/0081* (2013.01)

(58) Field of Classification Search
    CPC ... G01V 8/10; G01V 8/12; G01V 8/20; G06T 7/50; G06T 7/521; G06T 7/593; G06T 7/596; G06T 2207/10028; H04N 13/204; H04N 13/239; H04N 13/243; H04N 13/254; H04N 13/271; H04N 13/275; H04N 2013/0074; H04N 2013/0081; G05B 19/406; G05B 19/4061; G05B 2219/34404; G05B 2219/37492; G01S 17/88; G01S 17/89; G01S 17/894; G01S 17/93; G01S 17/931; G01S 7/4912
    See application file for complete search history.

(56) References Cited

U.S. PATENT DOCUMENTS

| | | | | |
|---|---|---|---|---|
| 9,792,746 | B2* | 10/2017 | Brunner | G07C 9/00309 |
| 10,295,331 | B2* | 5/2019 | Albert | G01S 17/10 |
| 10,302,251 | B2* | 5/2019 | Merx | F16P 3/142 |
| 10,331,977 | B2* | 6/2019 | Hornung | G01B 11/2513 |
| 10,404,971 | B2* | 9/2019 | Braune | G05B 19/406 |
| 10,452,939 | B2* | 10/2019 | Tani | G06V 10/25 |
| 10,726,538 | B2* | 7/2020 | Braune | G06V 20/52 |
| 10,762,703 | B2* | 9/2020 | Impera | H04N 13/204 |
| 10,969,762 | B2* | 4/2021 | Hornung | B25J 9/1676 |
| 11,067,717 | B2* | 7/2021 | Braune | G06V 10/98 |
| 11,174,989 | B2* | 11/2021 | Böhning | F16P 3/144 |
| 2006/0100783 | A1* | 5/2006 | Haberer | G05D 1/024 340/436 |
| 2007/0156372 | A1 | 7/2007 | Christ et al. | |
| 2008/0273758 | A1* | 11/2008 | Fuchs | F16P 3/142 382/106 |
| 2009/0268029 | A1* | 10/2009 | Haussmann | F16P 3/142 348/E7.085 |
| 2011/0001799 | A1* | 1/2011 | Rothenberger | G06T 7/50 348/47 |
| 2011/0273723 | A1* | 11/2011 | Haberer | F16P 3/14 348/46 |
| 2013/0201183 | A1 | 8/2013 | Park et al. | |
| 2015/0287200 | A1* | 10/2015 | Kokubun | G06T 7/20 348/143 |
| 2019/0362487 | A1* | 11/2019 | Braune | G06V 20/52 |
| 2021/0064037 | A1* | 3/2021 | Boutaud | G01S 17/42 |

OTHER PUBLICATIONS

Bailey, "An Efficient Euclidean Distance Transform", Institute of Information Science and Technology, Massey University, Palmerston North, New Zealand.

Schouten, et al., "Fast Exact Euclidean Distance (FEED) Transformation", Radboud Repository, Radboud University.

* cited by examiner

Figure 6a
Figure 6b
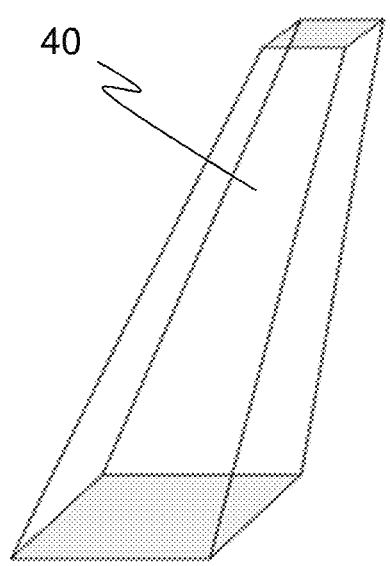
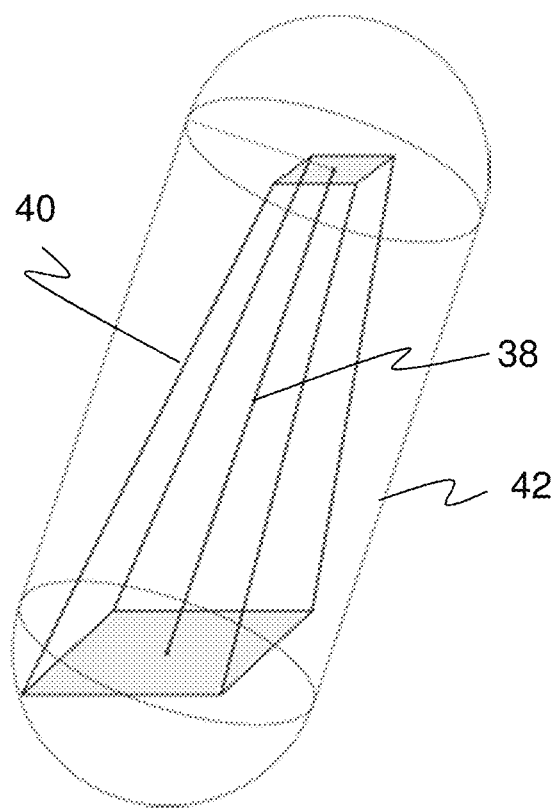

3D SENSOR AND METHOD OF MONITORING A MONITORED ZONE

FIELD

The invention relates to a 3D sensor, in particular to a 3D camera, for monitoring a monitored zone, wherein the 3D sensor has at least one light receiver for generating a received signal from received light from the monitored zone and has a control and evaluation unit that is configured to detect objects in the monitored zone by evaluating the received signal and to determine the shortest distance of the detected objects from at least one reference volume. The invention further relates to a method of monitoring a monitored zone, wherein a received signal is generated and evaluated from received light from the monitored zone for the optical 3D monitoring to detect objects in the monitored zone and to determine the shortest distance of the detected objects from at least one reference volume.

BACKGROUND 3D sensors record images that include a distance value in their pixels. These depth-resolved or three-dimensional image data are also called a depth map. The higher instrument and evaluation effort in comparison with a two-dimensional image detection is justified by the additional information in a number of applications. The 3D sensors include 3D cameras in different technologies, for example stereoscopy, triangulation, time of flight, comprising evaluation of the interference of passive two-dimensional patterns or of projected illumination patterns. Laser scanners are furthermore known that scan in two directions or in all three directions and that likewise detect three-dimensional image data over the respective scanning angles and the measured distance.

A particular area of use is safety engineering with the primary goal of protecting persons from danger sources such as are represented by machines in an industrial environment. The machine is monitored with the aid of the 3D sensor and accordingly, if a situation is present in which a person threatens to come dangerously close to the machine, a suitable securing measure is taken.

Sensors used in safety technology have to work particularly reliably and must therefore satisfy high safety demands, for example the EN 13849 standard for safety of machinery and the machinery standard IEC 61496 or EN 61496 for electrosensitive protective equipment (ESPE). To satisfy these safety standards, a series of measures have to be taken such as a safe electronic evaluation by redundant, diverse electronics, functional monitoring or special monitoring of the contamination of optical components.

The common securing concept provides that protected fields are configured that may not be entered by operators during the operation of the machine. If the sensor recognizes an unauthorized intrusion into the protected field, for instance a leg of an operator, it triggers a safety-relevant stop of the machine.

There is an increasing desire for closer cooperation with persons (HRC, human-robot collaboration) in the safety-engineering monitoring of robots. Relevant standards in this connection are, for example, ISO 10218 for industrial robots or ISO 15066 for collaborative robots. Protected fields and safety distances should be as small as possible in HRC and should possibly even be configured in a situation-adapted manner, naturally with the proviso that safety is maintained.

Standards ISO 13854, ISO 13855, and ISO 13857 deal with the establishment of safety distances.

An evaluation of objects and machines with respect to speed and to mutual distance is called "speed and separation monitoring" in said robot standards. Safe monitoring sensors such as laser scanners or 3D cameras, however, do not support this. They still work with the typical protected fields and they only deliver a binary shutdown signal of whether a protected field is infringed or not. Safety is admittedly ensured in this manner, but not particularly flexibly and also frequently with unnecessary safety overheads and thus restrictions of availability since the protected fields are configured for worst case scenarios and not the actual current situation.

A plurality of distances in three-dimensional space have to be calculated for a safety concept on the basis of the shortest distances between the object and the machine. An exact calculation at the time of flight means a very high calculation effort that can only be made with extreme processing resources with the required resolutions and response times. The effort can be reduced if the objects and the machines are represented by simple geometrical models; however, this necessarily brings about an additional underestimation of the distances since the models form boxes that are too generous. Apparent danger situations are thereby unnecessarily responded to that would have proved uncritical with an exact calculation.

G. Borgefors, "Distance transformations in digital images." Computer vision, graphics, and image processing 34.3 (1986), pp. 344-371 deals with distance transformations that produce a gray value image whose values each encode the distance from the next image feature pixel from a digital image having image feature pixels.

D. G. Bailey, "An efficient Euclidean distance transform." International workshop on combinatorial image analysis. Springer, Berlin, Heidelberg, 2004, pp. 394-408 describes an efficient algorithm for a distance transform with exact Euclidean distances.

T. Schouten et al. "Fast exact Euclidean distance (FEED) transformation." Grid Recognition, 2004. ICPR 2004. Proceedings of the 17th International Conference on. Vol. 3. IEEE, 2004 presents a further approach to limit the effort for a distance transformation. One of the measures is the advance calculation of the Euclidean distances between pixel positions.

All these papers are, however, restricted to the two-dimensional case and also have nothing to do with the explained safety applications. In addition, only a respective punctiform distance of a single pixel from the image features is calculated, but not the distance between two areal or even spatial zones.

Paths in a warehouse are planned in US2007/156372 A1. The warehouse is divided into zones having an entry point and an exit point. The problem is then divided into a path search within the starting zone to the exit point, from the start point to the target zone, and within the target zone from the entry point onward. The respective shortest paths from one zone to the other can be calculated in advance and stored in a table. The shortest distance required for a monitoring does not, however, follow any path, but rather corresponds to a direct link. In addition, the pathfinder problem of US 2007/156372 A1 is again two-dimensional.

SUMMARY

It is therefore the object of the invention to provide an improved distance determination for a three-dimensional monitoring.

This object is satisfied by a 3D sensor and by a method of monitoring a monitored zone in accordance with the respective independent claim. Received light from the monitored zone is detected by a light receiver and a received signal is acquired from it. The configuration of the light receiver and thus the kind of received signal depend on the 3D sensor. The light receiver is an image sensor, for example, or a pair of image sensors, and the information read from the pixels is called a received signal in sum. The received signal is evaluated in the 3D sensor to detect objects, for instance as a 3D point cloud or preferably in a detection map, i.e. in a two-dimensional image, in whose pixels entries are respectively carried out where a relevant object has been detected. A shortest distance of the detected objects from at least one reference volume is then determined. The reference volume is a part zone of the monitored zone and is fixed virtually, but with reference to the real scene, and the reference volume has a specific meaning depending on the application, for instance that a machine to be secured is located there or a detected object in this spatial zone should trigger a specific response.

The invention starts from the basic idea of relieving the distance calculation at the time of flight by advance calculations. A memory is provided for this purpose in which distances calculated in advance are stored, in particular as a look-up table (LUT). In operation, the distances calculated in advance are read in or looked up and are either used directly as the shortest distances of the detected objects from at least one reference volume or as a basis for a further distance determination.

The invention has the advantage that an efficient calculation of distances in space is also made possible while taking account of masking phenomena from the central perspective. Higher resolutions and short response times can thereby also be implemented with moderate hardware demands. The effort for a distance calculation with respect to a reference volume in space scales with the geometrical complexity of the reference volume. However, this effort is no longer incurred at the time of flight in accordance with the invention, but rather beforehand. Practically any desired reference volumes thereby become possible without any restriction to simple modeling since in accordance with the invention the calculations at the time of flight are practically independent of the specific geometry of the reference volume.

The 3D sensor is preferably a 3D camera. A 3D camera can use any known technique such as a triangulation principle in which two camera images of a moving camera or of a stereo camera are correlated with one another or a camera image is correlated with a known projection pattern and disparities are estimated or a time of flight principle with a direct time of flight measurement of light signals or phase measurement. A laser scanner also generates 3D point clouds that are restricted to one scanning plane with a classical laser scanner. This restriction with a laser scanner is lifted by changing the scan plane, that is also a scan moving in elevation or by a plurality of scanning beams offset in elevation. The distance determination in accordance with the invention can also be used for other three-dimensional sensors, for instance of a radar or of an ultrasound sensor.

The 3D sensor is preferably safely configured for use in personal protection from a dangerous machine and for this purpose satisfies the standards named in the introduction or corresponding standards to secure a dangerous machine.

The reference volume is preferably a hazard zone that secures a machine. A hazard zone is a modeling of the machine and its work movements to secure it. The hazard zone includes the machine itself, part zones thereof such as tool tips or the moving part of a robot arm and/or other zones such as access paths. A simple geometry of the hazard zone simplifies the distance calculation at the cost of availability and in accordance with the invention the effort for complex geometries can already be made in advance. Hazard zones are configured in the planning of the safety application, under certain circumstances also fully automatically or semiautomatically using the provided movement routine of the machine.

Detected objects in a hazard zone are preferably ignored or the hazard zone is masked in the detection. The hazard zone itself is therefore always considered free of objects to be detected or rather as blocked by the machine. There would actually easily be room for such objects in the reference volume of the hazard zone. The machine naturally also itself forms an object that is first detected by the 3D sensor. Ignoring this simplifies the monitoring and the determination of shortest distances since the dynamics of the machine within the hazard zone thus do not play any role. This is also unproblematic from a safety engineering aspect since each object is recognized in good time when it approaches the hazard zone.

The 3D sensor preferably has a safe interface for outputting shortest distances. Conventionally, such a safe interface of a sensor used in safety engineering is a binary interface via which a binary signal is output whether a protected field infringement is present (OSSD, output signal switching device). Instead, the respective current shortest distance is now safely provided for a connected control. This control, for instance the higher ranking control of a robot cell or also the control of the machine or of the robot itself can very simply determine whether there is a hazard with respect to the shortest distance and takes over the actual securing function itself. Alternatively, the safety evaluation already takes place in the 3D sensor.

The sensor is preferably configured for a detection capacity in which objects from a minimum size onward are safely detected, with only objects of the minimum size being considered for the determination of the shortest distance. The detection capacity is a suitability specified in the relevant standards of a safe sensor to safely detect objects of a minimum size in the total monitored zone. The corresponding configuration of the sensor relates to its design, that is its optics, its light receiver, and further possible components, not yet named, such as lighting, and the secure evaluation. The detection capacity in the first instance does not preclude smaller objects from also being detected. However, protection is not guaranteed for objects that are smaller than the minimum size; for example, a finger is not reliably detected with a sensor designed for arm protection. Objects smaller than the minimum size are therefore possibly excluded in the evaluation by means of filtering. It is also possible to select a minimum size above the detection capability, that is not to utilize a resolution provided per se. Numerical examples can be given as 14 mm for finger protection or in the range from 30-80 mm for the protection of extremities, in particular 55 mm for upper arm protection or 200 mm for the body.

The control and evaluation unit is preferably implemented as an embedded system. A compact architecture closed in itself of the 3D sensor is made possible by embedded hardware such as SoC (system on chip) or FPGA (field programmable gate array). The limited processing capacities are nevertheless sufficient for a real time calculation due to the determination of shortest distances in accordance with the invention. The implementation can also be efficiently divided between a microprocessor and an FPGA or ASIC (application specific integrated circuit), for example in that the FPGA accesses a RAM memory directly that the microprocessor writes. Alternatively to an embedded system, a scenario is, for example, conceivable in which a sensor or a plurality of sensors perform(s) the object detection, for instance in the form of detection maps, and the distance calculation then takes place on a central processor or in a higher ranking control on the basis of the merged sensor data.

The control and evaluation unit is preferably configured to read a precalculated distance from an intermediate reference zone from the memory and to determine the shortest distance from it. In this embodiment, at least some of the distances calculated in advance are not yet the final result, but will be further refined. Alternatively, the distances read from the memory are used directly as the shortest distance for the discretized location of the object. It is also conceivable to carry out a refining post-calculation for detected objects in some part zones of the monitored zone and not in others.

The control and evaluation unit is preferably configured to calculate shortest distances from the reference volume for different zones of the monitored zone and to store them in the memory. In this embodiment, the 3D sensor itself is able to calculate the distances in advance. Alternatively, this takes place on an external processor, for example on a configuration processor or in a network or a cloud, and the distances calculated in advance are subsequently transferred to the memory of the 3D sensor. The calculation of shortest distances implemented in the 3D sensor can also be used at the time of flight, for instance when exceptionally a higher accuracy is required or when no distances calculated in advance are present for a part zone in which an object has been detected Distances calculated in advance are preferably stored in a 3D grid of the monitored zone in the memory. The 3D grid covers at least the relevant part of the monitored zone in which objects should be detected, preferably the total work zone of the 3D sensor. The detected objects are arranged in the 3D grid at the time of flight. If a detection map is prepared whose pixels are exactly occupied at the positions in which relevant objects have been detected, the lateral discretization has thus already been carried out and only the depth value is discretized in accordance with the depth resolution of the 3D grid. The 3D grid is preferably only regular in the sense of a rectangular grid in a lateral direction. To correspond to the central perspective of the 3D sensor, the rectangular grid is preferably centrally stretched as the depth value increases; that is the grid elements are not parallelepipeds, but truncated pyramids.

Grid elements of the 3D grid preferably become higher as the distance from the 3D sensor increases. This not only relates to the lateral increase in size due to the central perspective, but also to an additional increase in size in the depth direction. The depth estimation becomes less accurate for larger distances and it is therefore then also sufficient to work with a greater height in the depth direction of coarser grid elements.

On the determination of a distance calculated in advance of a grid element of the 3D grid, the shortest distance from a line of sight is preferably determined from the 3D sensor through the grid element itself and the part of the line of sight disposed behind it from the view of the 3D sensor, in particular a shadow volume from the grid element itself and from the grid elements disposed therebehind in the direction of view of the 3D sensor. The projective shadow, occlusion, or masking from the central perspective of the 3D sensor is thus taken into account, i.e. the projection of an object along the line of sight from the 3D sensor into the distance. The projective shadow, which cannot be seen, is considered as also occupied by an object as a precaution. The distance of the projective shadow of a grid element from a reference volume can be shorter than that of the grid element and this then the correct value from safety considerations.

The shadow volume is preferably boxed by a cylinder having semispheres at the end sides for the determination of a distance calculated in advance. The shadow volume is thus overestimated, which is of no concern for safety. The calculations become simpler in exchange. These calculations admittedly do not take place at the time of flight, but any desired processing resources are also not available in advance or there are advantages in shortening the waiting times until a configuration can be tested or put into operation.

Discretization errors of the distances calculated in advance are preferably conservatively underestimated. Discretization errors arise due to the arrangement in a 3D grid. For reasons of safety, rounding should not simply be carried out here, with the consequence that a shortest distance is overestimated and thus a risk is possibly noticed too late. Each distance calculated in advance is rather corrected as a precaution such that inaccuracies always only result in an underestimate of the shortest distance and therefore possibly in an unnecessary safety-relevant response, but without a risk. It is, for example, always assumed for this purpose that an object is located in a grid element at its point closest to the reference volume.

A respective set of distances calculated in advance is preferably stored per reference volume. Complex monitoring work with a plurality of reference volumes monitored in parallel and/or dynamically changing reference volumes are thus divided. The respective sets or look-up tables of distances calculated in advance are stored in the memory of the sensor so that the latter has direct access or they serve as external modules from which distances calculated in advance in dependence on the situation are compiled for the memory of the sensor.

Reference volumes can preferably be activated and distances calculated in advance from at least one combination of reference volumes active in parallel can be compiled from distances calculated in advance per reference volume. This serves to monitor a plurality of reference volumes in parallel, for instance a plurality of machines or different zones of the same machine. The sets of distances calculated in advance per reference volume or the look-up tables form a kind of module system from which the modules required for the monitoring situation or the look-up tables are assembled in accordance with the active reference volumes. The reference volumes can thereby be active in any desired combination and up to the limit of the memory and of a memory throughput of any desired number while work is nevertheless carried out using distances calculated in advance. Look-up tables can be combined such that a plurality of entries are carried out therein for each grid element in accordance with the individual active reference volumes. Alternatively, the shortest distances are only consolidated with the respective shortest distance from the next reference volume. Only a global shortest distance from all reference volumes together can thus then naturally be determined; no longer from the individual reference volumes and without knowing which specific reference volume is the closest.

The control and evaluation unit is preferably configured to switch over to a different combination of active reference volumes. For this purpose, preferably only the sets of distances calculated in advance from each reference volume are recombined. The changing reference volumes form a dynamism of the monitored work process, for instance when a robot changes its work zone. It would in principle be conceivable to define the reference volumes generously so that they simultaneously cover all the phases of the process routine. Changing reference volumes can, however, remain a lot smaller since they only include the currently relevant part zones.

Individual preparatory steps or a plurality thereof until the distances calculated in advance required for the next operating phase are available in the memory of the 3D sensor can be worked through in dependence on the embodiment in the 3D sensor itself and/or externally, for example in a configuration processor, in a higher ranking control, or in a cloud with a subsequent transfer of the results into the memory of the 3D sensor.

Additional information on a distance calculated in advance is preferably stored in the memory and further characterizes the distance or the reference point from which there is a distance. Additional information is, for example, provided on which shortest distance there is from a specific geometrical point of a hazard zone or machine or what is located there is described in more detail. A tool tip, for example, may have to be differently evaluated from a safety engineering aspect under certain circumstances than an obtuse articulated region only moved a little.

At least some of the distances calculated in advance are preferably stored relative to other distances calculated in advance. Absolute values are in particular only available for some grid elements, for instance the topmost layer facing the 3D sensor, while the remaining distances calculated in advance only specify the difference from these absolute values in a direct or cascading manner. This is a memory-efficient encoding or compression with which there is only a small memory requirement. Incremental compression enables smaller memory use.

In a preferred further development, a plurality of 3D sensors are combined to form a sensor assembly whose monitored zones and/or perspectives complement one another. It is a possible advantage to detect a monitored zone that is larger overall by mutual complementing. In addition, different perspectives are helpful to reduce shadows. To keep the common evaluation particularly simple, shortest distances are first determined from the view of the individual 3D sensors and are subsequently compared and offset between the 3D sensors to find the shortest distance for the sensor assembly. In principle, object positions or received signals, in particular 3D point clouds can also be merged earlier in the processing chain; the sensor assembly then corresponds to a more powerful 3D sensor with a greater field of view and/or fewer shadows.

The method in accordance with the invention can be further developed in a similar manner and shows similar advantages in so doing. Such advantageous features are described in an exemplary, but not exclusive manner in the subordinate claims dependent on the independent claims.

BRIEF DESCRIPTION OF THE DRAWINGS

The invention will be explained in more detail in the following also with respect to further features and advantages by way of example with reference to embodiments and to the enclosed drawing. The Figures of the drawing show in:

FIGS. 6a-b a further representation of the grid elements of a view ray and a simplifying box with a cylinder model.

DETAILED DESCRIPTION

Figure 1:
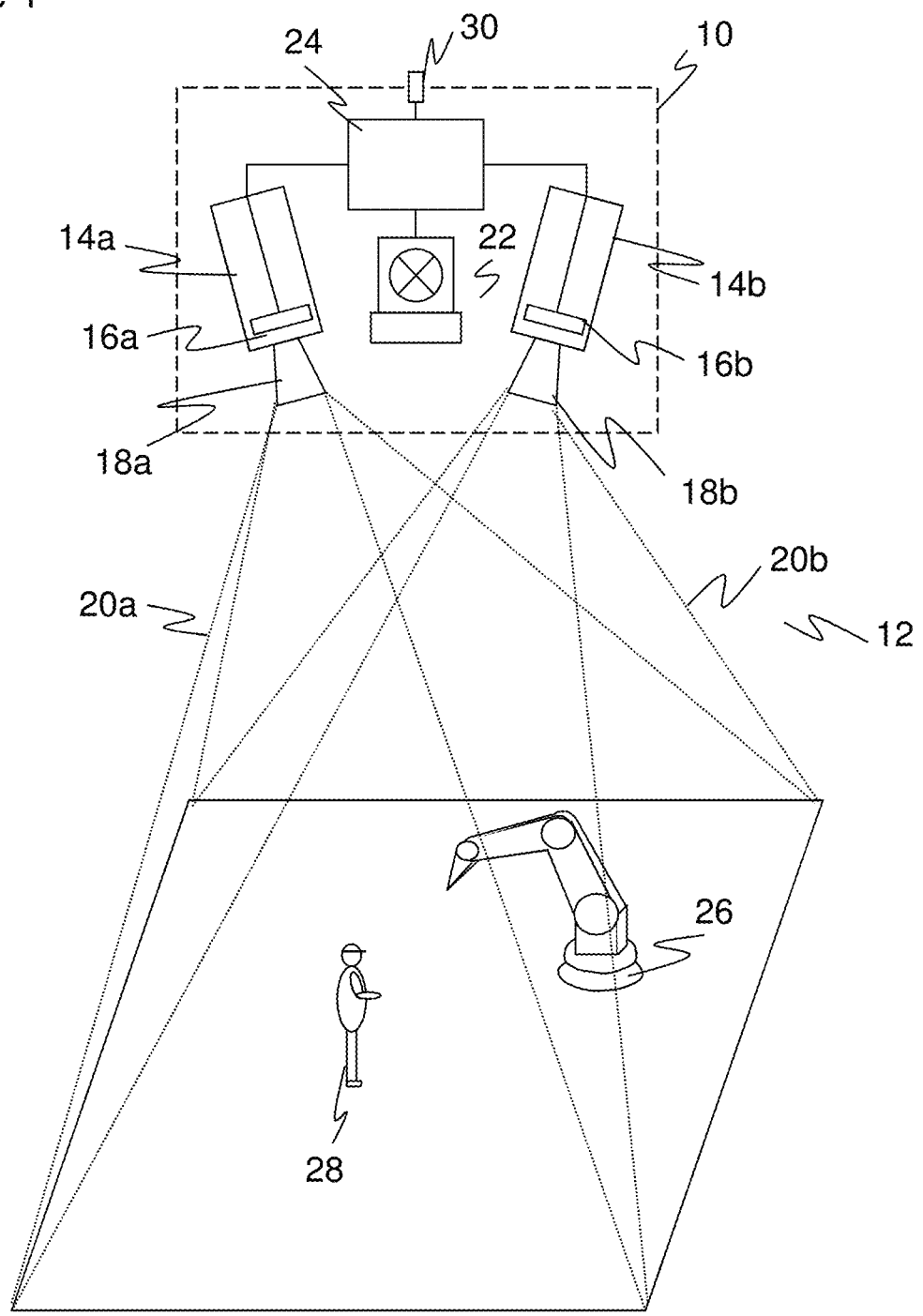
FIG. 1 a schematic three-dimensional representation of a 3D sensor and its monitored zone.

FIG. 1 shows the general design of a stereo camera for recording a depth map in a schematic three-dimensional representation. The stereo camera is only an example for a 3D sensor 10 in accordance with the invention with reference to which the object detection in three-dimensional image data will be explained. The other 3D cameras named in the introduction would equally be conceivable with a determination of the time of flight or an evaluation of the interference of passive two-dimensional patterns or with correlation of image and projected illumination patterns and laser scanners and other 3D detection principles.

Two camera modules 14a, 14b are mounted at a known fixed distance from one another for the detection of a monitored zone or spatial zone 12 and each take images of a spatial zone 12. An image sensor 16a, 16b, usually a matrix-type imaging chip, is provided in each camera module 14a, 14b and records a rectangular pixel image, for example a CCD or a CMOS sensor. The two image sensors 16a, 16b together form a 3D image sensor or light receiver for detecting a depth map. One objective 18a, 18b having an imaging optics is associated with each of the image sensors 16a, 16b respectively which in practice can be realized as any known imaging objective. The maximum angle of view of these optics is shown in FIG. 1 by dashed lines which each form a pyramid of view 20a, 20b.

An illumination unit 22 is provided between the two image sensors 16a, 16b to illuminate the spatial zone 12 with a structured pattern. The stereo camera shown is accordingly configured for active stereoscopy in which the pattern also imparts evaluable contrasts everywhere to scenery that is structure-less per se. Alternatively, no illumination or a homogeneous illumination is provided to evaluate the natural object structures in the spatial zone 12, which as a rule, however, results in additional aberrations.

An evaluation and control unit 24 is associated with the two image sensors 16a, 16b and with the lighting unit 22. The control and evaluation unit 24 can be implemented in the most varied hardware, for example digital modules such as microprocessors, ASICS (application specific integrated circuits), FPGAs (field programmable gate arrays), GPUs (graphics processing units) or mixed forms thereof that are preferably located in the 3D sensor 10, but that can also be distributed over any desired internal and external components, with external components also being able to be integrated via a network or cloud provided that latencies can be managed or tolerated. Since the generation of the depth map and its evaluation is very processor intensive, an at least partly parallel architecture is preferably formed.

The control and evaluation unit 24 generates the structured illumination grid with the aid of the illumination unit 22 and receives image data of the image sensors 16a, 16b. It calculates the 3D image data or the depth map of the spatial zone 12 from these image data with the aid of a stereoscopic disparity estimate. The total detectable spatial zone 12 can be restricted via a configuration, for example to mask interfering or unnecessary regions.

An important safety engineering application of the 3D sensor 10 is the monitoring of a machine 26 that is symbolized by a robot in FIG. 1. The 3D sensor 10 is for this purpose preferably failsafe in the sense of safety standards such as those named in the introduction. The machine 26 can also be substantially more complex than shown, can consist of a number of parts, or can actually be an arrangement of a plurality of machines, for instance of a plurality of robots or robot arms. It is monitored whether objects 28, shown as a person, are at risk from the machine 26 and whether a corresponding safety-relevant response has to take place, for example whether the machine 26 stops, decelerates, or evades. For this purpose, the 3D sensor 10 has a safe interface 30 via which corresponding responses are triggered or monitoring parameters required for a safety evaluation are output, either directly to the machine 26 or to an intermediate station such as a safe control.

Figure 2:
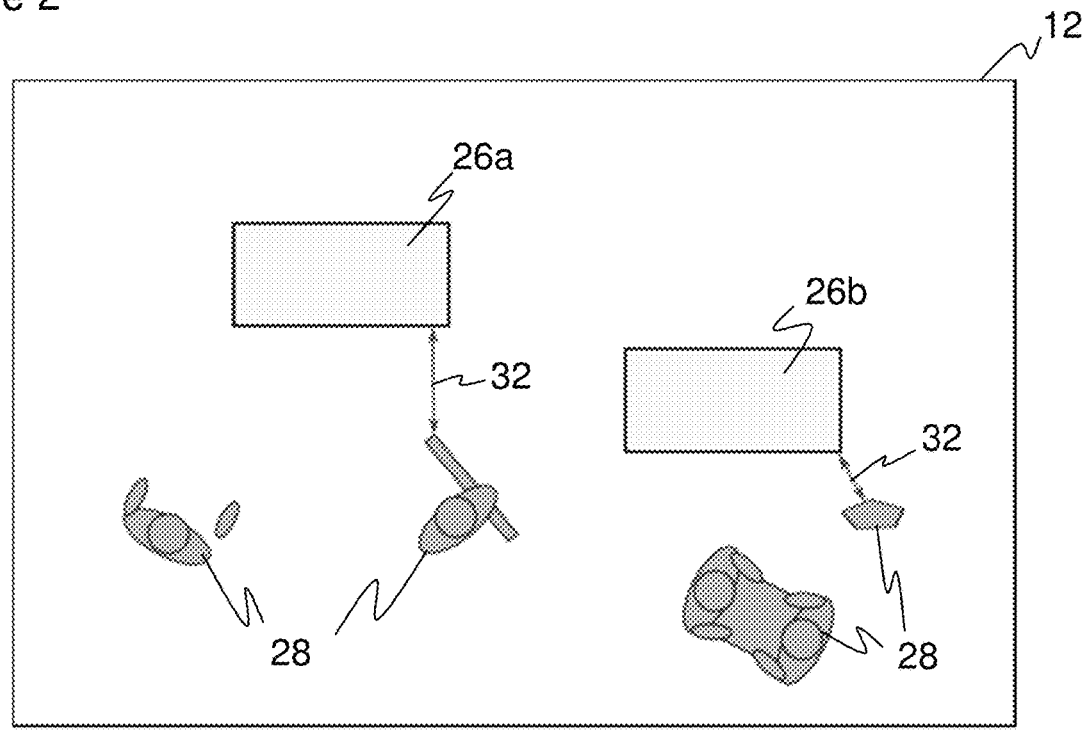
FIG. 2 an exemplary monitoring situation with a plurality of hazard zones and objects.
Figure 3:
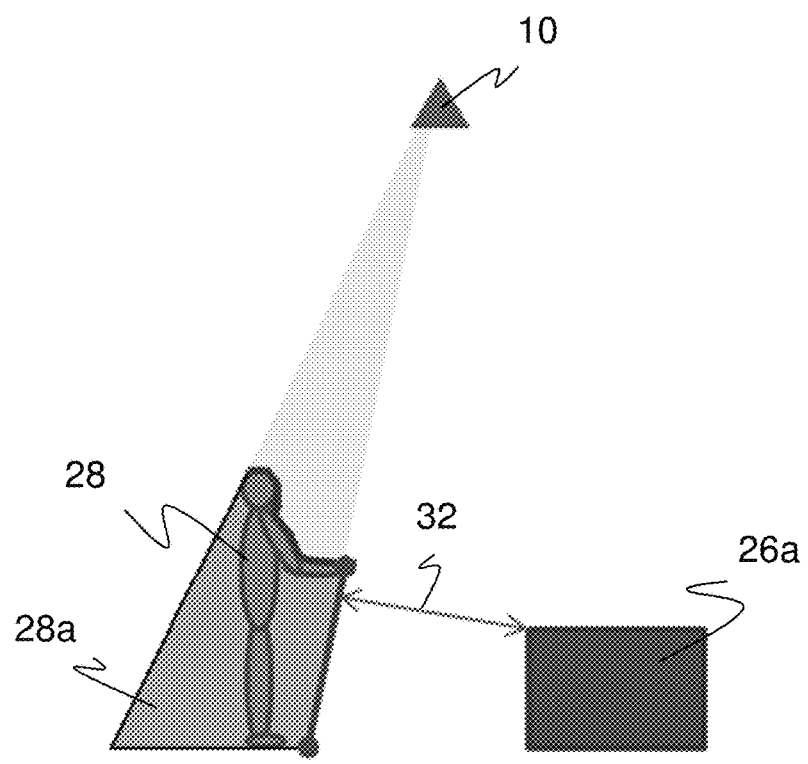
FIG. 3 a schematic side view of an exemplary detection situation of a person in the vicinity of a hazard site.

The safety evaluation is based on a distance monitoring that will now first be explained in content with reference to FIGS. 2 and 3. Subsequently, efficient calculation processes for the underlying shortest distances will be presented with reference to FIGS. 4 to 6. Although the invention is described for a securing of a human machine collaboration, these calculation processes can also be used for other monitoring work.

FIG. 2 shows an exemplary monitoring situation in the spatial zone 12 having a plurality of hazard zones 26a, 26b and objects 28. FIG. 3 is a schematic side view of a single hazard zone 26a with an object 28 in its vicinity.

A hazard zone 26a, 26b is a preferred model of the hazardous machine 26 and describes the zone possibly hazardous for humans as a volume in space. A hazard zone 26a, 26b is, for example, the spatial zone in which the machine 26 executes work movements in a respective time period or, even more generally, a spatial zone that secures the machine 26, either because the machine 26 is at least partly surrounded by it or because the hazard zone 26a, 26b blocks access to the machine 26. The hazard zone 26a, 26b can surround the machine 26 with a little spacing to leave sufficient clearance for the work movements. Simple hazard zones 26a, 26b such as parallelepipeds or spheres can be defined and empty spaces can in turn be accepted to simplify the calculations. The invention, however, already carries out complex calculations in advance so that complex geometries are preferably also permitted.

A plurality of hazard zones 26a, 26b can be active in parallel. They, for example, model a plurality of machines 26 and/or a plurality of moving part sections of a machine 26. Hazard zones 26a, 26b can be rigid and can comprise all conceivable work movements. Alternatively, respective hazard zones 26a, 26b are defined for part sections of the work movement that are utilized in a sequence corresponding to the process and that are smaller and are better adapted. Hazard zones 26a, 26b can be preconfigured by a fitter, optionally per process step, in a corresponding software tool, also semiautomatically or fully automatically by observing the work routines, or can, for example, be dynamically taken over by a control of the machine 26.

Objects 28 are typically shown as persons because it is a question of personal protection, but with the 3D sensor 10 preferably not distinguishing whether an object 28 is a person or at least only on the basis of simple criteria such as minimum heights. Simple or complex body models are also not precluded, on the other hand. The control and evaluation unit 24 detects the objects 28 with the aid of the depth map. A possible representation is a so-called detection depth map whose pixels include a distance value wherever a valid object 28 was recognized at the respective lateral position. and that otherwise remains blank. In this connection, valid means that the object 28 is also still considered relevant after filtering with a minimum size, a body model, a relationship with a coarsely detected object such as in EP 3 200 122 A1, or the like.

Two hazard zones 26a, 26b are to be monitored in the example of FIG. 2 and four objects 28 are currently recognized by the 3D sensor 10 in its environment. Two of the objects 28 are individual persons, without the 3D sensor 20 having to explicitly acquire this information; a further object 28 comprises two persons merged together, either because they are carrying a workpiece together and are so actually connected or because the segmentation was unable to separate the two persons. There is additionally another object 28 that cannot be identified in any more detail and could be an article or a false detection. If it is beneath the minimum size, it can be ignored; otherwise it must be recognized as a person as a precaution. The non-connected arm of the person at the far left forms, in dependence on the evaluation, a separate further object or is added to the person, in particular according to the teaching of EP 3 200 122 A1.

The control and evaluation unit 24 continuously calculates the shortest distance of the object 28 closest to a respective hazard zone 26a, 26b. All the object points have to be looked at for this purpose in principle. The depth map is preferably prefiltered and only still includes the detected objects, or a detection map briefly introduced above is used that only includes the distances of the relevant objects from the 3D sensor 10.

Arrows 32 are drawn in FIGS. 2 and 3 that represent the shortest distances with respect to the hazard zones 26a, 26b in the current situation. The shortest distance connects the closest point of a hazard zone 26a, 26b to the nearest point of the next object 28. It is assumed in this representation that the small object 28 at the bottom right in FIG. 2 exceeds the minimum size. It would otherwise be ignored and instead the distance from the two merged persons who form the second-closest object 28 would be output. As can be recognized in FIG. 3, the projective shadow 28a of the objects 28 is also taken in account in the calculation of the shortest distances, that is that region that an object covers from the central perspective of the 3D sensor 10. The shortest distance is thereby also a little smaller in this example than that from the object 28 itself would be. This is, however, necessary from a safety engineering aspect because a relevant object 28 could be hidden at this position.

The respective last determined shortest distance with respect to a hazard zone 26a, 26b of the object 28 closest to this hazard zone 26a, 26b is provided cyclically or acyclically depending on the required and possible response time of the 3D sensor 10 at the safe interface 30, and indeed preferably distinguishable per hazard zone 26a, 26b. A control connected to the safe interface 30, either a higher ranking control or that of the machine 26, evaluates the shortest distance and replans, where required, the next workstep in dependence on the shortest distance. In the danger case, a safety-relevant response is initiated so that the required safety distance between human and machine is continuously ensured. Whether this is necessary can depend, in addition to on the shortest distance, on further conditions such as the speeds or the properties of the object 28 and the machine zone 26, and on the impending collision, for which purpose further parameters are output with the shortest distance depending on the embodiment.

The distance calculation is an extremely processor-intensive process since to localize the shortest distance between a plurality of spatial points of the hazard zone 26a, 26b and the object 28, distances have to be calculated for a comparison, and this also has to be done for a plurality of hazard zones 26a, 26b and objects 28 at refresh rates of some ten Hertz. To do this with limited processing resources in real time or quasi real time within a defined response time, distances are calculated in advance in accordance with the invention. The distances calculated in advance are stored by way of example in a look-up table (LUT), but with other representations equally being conceivable despite the use of this term.

The preparation of look-up tables for a subsequent operating phase preferably takes place in a plurality of steps. First an individual look-up table is generated for every hazard zone 26a, 26b that should be active at some time in the process routine. Combined look-up tables are formed therefrom for all combinations of simultaneously active hazard zones 26a, 26b that occur in the process routine. At the time of flight, the suitable combined look-up table is activated for the subsequent process step with the respective hazard zones 26a, 26b and the shortest distances are efficiently calculated with its help. This is only a preferred embodiment; in principle distances calculated in advance can also be acquired in different manners and can in particular be individually prepared instead of being combined from individual look-up tables per hazard zone 26a, 26b or all the combinations are prepared independently of the process routine.

Figure 4:
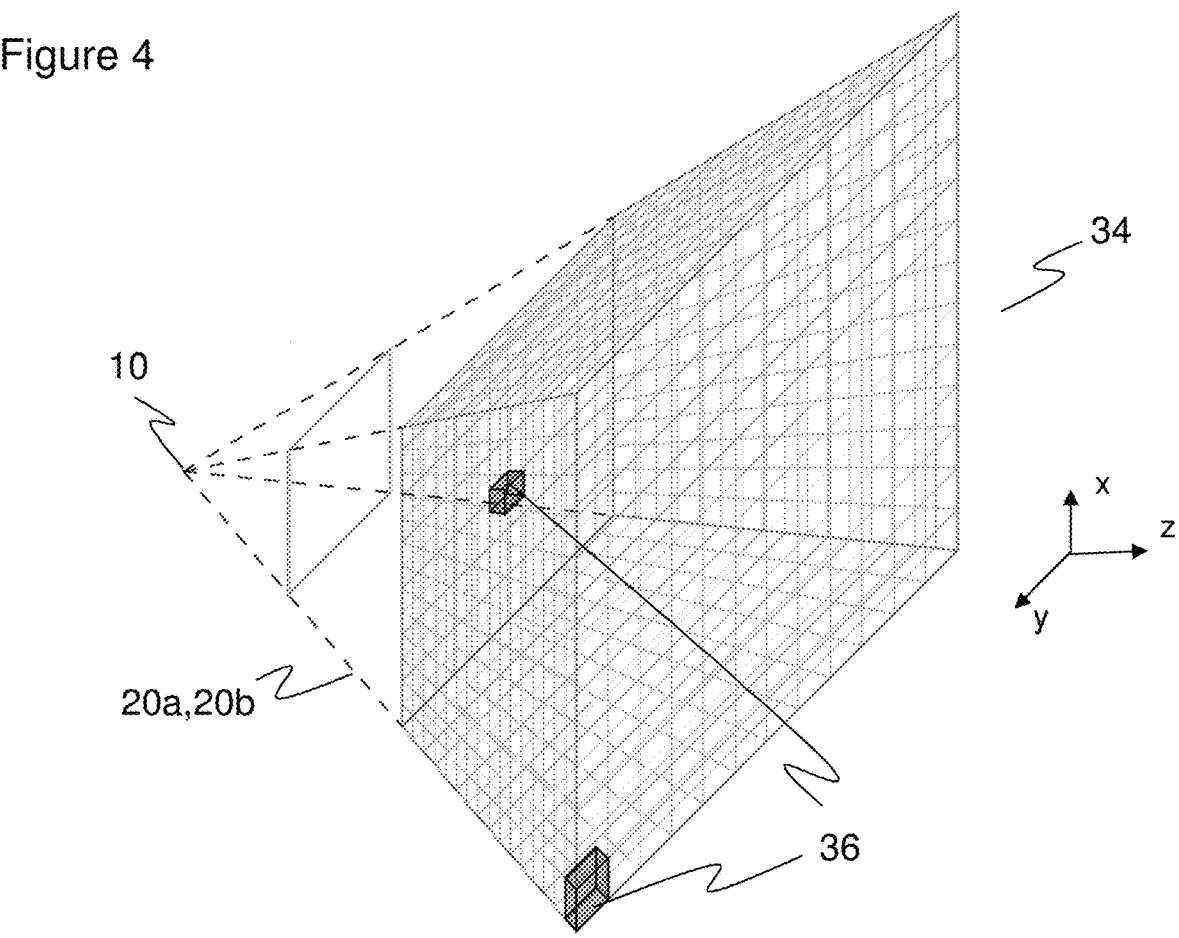
FIG. 4 a representation of a 3D grid for the calculation of shortest distances in advance.
Figure 5:
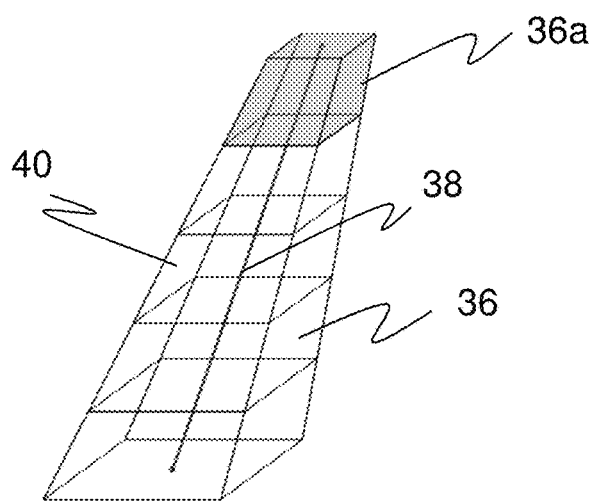
FIG. 5 a representation of the grid elements of a view ray of the 3D sensor.

FIGS. 4 to 6 illustrate the first step with which a respective individual look-up table is calculated for an individual hazard zone 26a, 26b (HDM, hazard distance map). In advance of the time of flight, which is here called a configuration time, the control and evaluation unit 24 itself or a configuration processor generates a 3D grid 34, in particular in a cloud. The resolution in a lateral X-Y direction preferably corresponds to that of the depth or detection map, typically in an order of magnitude of a plurality of 100×100. A depth discretization of, for example, ten to twenty steps or more is selected in the depth or Z direction. The 3D grid 34 does not have to be regular as shown. The height of the individual grid elements 36 can in particular become larger with the depth value, that is with an increasing distance from the 3D sensor 10. This corresponds to the growing depth imprecision of the 3D sensor so that a fine grid is not necessarily sensible at larger distances.

The 3D grid 34 preferably, but not necessarily, covers the total work zone of the 3D sensor 10, with the work zone in turn only being able to be a portion of the maximum possible field of vision. The individual grid elements 36 of the 3D grid 34 are not regular voxels, but represent truncated pyramids due to the central perspective of the 3D sensor 10. The 3D grid 34 is nevertheless stored as an ordered field with indices (x, y, z) or a comparable representation, without taking account of the shape of the truncated pyramids.

FIG. 5 shows the grid elements 36 along an exemplary view ray 38 of the 3D sensor 10 that is here discretized with only five depth values in simplified form. In the example shown, the distance from a hazard zone 26a, 26b is calculated for the topmost grid element 36a of the view ray 38. The total view ray 38 up to the lower end is also used in this distance determination. The shortest distance calculated in advance for the grid element 36a can therefore be present from a region of the view ray 38 that is below the grid element 36a. This corresponds to a consideration of the projective shadow 28a shown in FIG. 3 since an object 28 in the topmost grid element 36a would cover further objects along the view ray 38. Alternatively to a determination of distances from the view ray 38, i.e. a line that is infinitely thin in principle, the distance from the view ray volume 40 from the grid element 40 onward can be downwardly determined, with the view ray volume 40 also being called a shadow volume since it also includes the projective shadow 28a.

The specific geometrical distance determination in three-dimensional space is processor intensive, particularly since any desired complex shapes of the hazard zone 26a, 26b are preferably permitted. It is, however, mathematically elementary despite the substantial effort and will not be further explained here. The shortest distance found is stored in the grid element 36a. It must be noted that discretization errors always have to be treated by the finite resolution of the 3D grid 34 such that the shortest distances are conservatively underestimated. This can be taken into account in a manner that the value calculated in advance corresponds to the most unfavorable point in the grid element 36 or it is taken into account later in the discretization or arranging of the actual object points in the 3D grid 34 at the time of flight.

Once the distance calculated in advance for the topmost grid element 36a is determined, the grid element 36 disposed thereunder is looked at and the now shorter remaining view ray 38 up to the lower end is used for the distance calculation. Once the 3D grid 34 is also downwardly filled with distances calculated in advance for the further grid elements 36a of the view ray 38, a change is made to the next view ray 38 until the 3D grid 34 and thus the look-up table is complete for this hazard zone 26a, 26b.

It is conceivable to store incremental values in the look-up table for data compression. For example, an absolute value is only stored for the topmost layer of grid elements 36a of the 3D grid 34 and the change from the respective topmost grid element 36a of the same view ray 38, or in a cascading manner to the respective upper neighbor, for the remaining grid elements 36. Conversely, however, additional information on the distances calculated in advance can also be stored; for instance, the reference point of the hazard zone 26a, 26b that delivered the shortest distance, the reference point within the grid element 36 or which specific part of the machine 26 is at the shortest distance and how dangerous it is.

Previously, either a distance from the straight segment, that is infinitely thin in principle, of the view ray 38 of the exact frustopyramidal geometry of the view ray volume 40 of the surrounding grid elements 36 was calculated in the distance calculation. FIG. 6 illustrates a possible approximation in a further embodiment. FIG. 6a here first again shows the view ray volume 40 of a view ray 38 as a truncated pyramid. FIG. 6b represents the conceivable approximation by means of a cylinder 42 that is closed by semispheres at its ends and illustratively forms a capsule. Ultimately, the view ray 38 is thus widened until it includes the view ray volume 40. In practice, the radius of the cylinder 42 is simply deducted from the values that are determined with respect to the infinitely thin view ray 38 for the distance determination. This radius is derived from the diagonal of the base surface of the truncated pyramid. The required conservative underestimate of the distances calculated in advance is ensured automatically and everywhere with a very simple calculation rule due to the cylinder 42. A further advantage of this procedure is a simplified calculation with respect to a consideration of the exact frustopyramidal geometry of the view ray volume 40. This admittedly takes place before the time of flight, but short waiting times and simple implementations are also of advantage for this.

A look-up table or HDM is respectively generated for every hazard zone 26a, 26b in the described manner. In operation, a plurality of hazard zones 26a, 26b can preferably be active in parallel. To then be able to calculate a plurality of shortest distances from a respective plurality of hazard zones 26a, 26b in parallel, the individual look-up tables are now advantageously combined in a second step. If a dynamic switchover of the respective active hazard zones 26a, 26b is provided for different process steps, a plurality of combinations is accordingly prepared for the possible configurations of simultaneously active hazard zones 26a, 26b. Such a combined look-up table of a plurality of HDMs is also called an ADM (activation distance map).

The combined look-up table together includes all the distances calculated in advance for a specific configuration of active hazard zones 26a, 26b. A conceivable structure is that of the 3D grid 34 and thus of the individual look-up table (HDM) itself, only that not only an entry is made in each grid element 36, but as many entries after one another as hazard zones 26a, 26b are active. The memory structure is then (x, y, z, i), where i is the number of the hazard zones 26a, 26b active in parallel. Alternatively, only one entry is still stored per grid element 36 that corresponds to the distance from the next hazard zone 26a, 26b consolidated over all the contributing individual look-up tables. Which specific hazard zone 26a, 26b the shortest distance of a next object 28 belongs to can then naturally no longer be differentiated at the time of flight, but the globally shortest distance from any hazard zone 26a, 26b can be sufficient for specific safety concepts.

The combined look-up tables are, for example, merged from the individual look-up tables at the configuration time or on the booting of the system. A combined look-up table is at least then ready in the memory of the 3D sensor 10 for the operation for each parallel activation of hazard zones 26a, 26b required in the process routine.

At the time of flight, the associated combined look-up table is then first also activated with the active hazard zones 26a, 26b. On a switchover to a different combination of hazard zones 26a, 26b at the time of flight, a switchover is simply made to the memory region in which the suitable combined look-up table is present.

Each object point of the detected relevant objects 28 or each entry in the detection map is discretized in accordance with the 3D grid 34. If its lateral X-Y resolution corresponds to the resolution of the depth or detection map, the discretization is limited to the depth value. The distance calculated in advance from each active hazard zone 26a, 26b is then read from the grid element 36 of the combined look-up table that corresponds to the discretization of the observed object point. The suitable distance calculated in advance determined in this manner is used either directly as the shortest distance for this object point or it serves as a basis for a finer distance calculation, for instance for the determination of the next view ray 38, and the distance is thus only calculated exactly once.

A simple comparison of the shortest distances thus localized per object point, that can also be carried out successively in the passage through the object points for the respective looking up or calculation of its distance from the next hazard zone 26a, 26b, then very quickly delivers the sought shortest distance between the individual hazard zones 26a, 26b and the respective next object 28.

The invention claimed is:

1. A 3D sensor for monitoring a monitored zone, wherein the 3D sensor comprises:
at least one light receiver for generating a received signal from received light from the monitored zone and
a control and evaluation unit having a memory, the control and evaluation unit detecting objects in the monitored zone by evaluating the received signal, determining the shortest distance of the detected objects from at least one reference volume, and reading at least one distance calculated in advance from the reference volume from a memory for the determination of the respective shortest distance of a detected object,
wherein distances calculated in advance are stored in the memory in a 3D grid of the monitored zone,
and wherein on a determination of a distance calculated in advance of a grid element of the 3D grid, the shortest distance is determined from a line of sight from the 3D sensor through the grid element itself and a part of the line of sight disposed behind it from a view of the 3D sensor.

2. The 3D sensor in accordance with claim 1, wherein the 3D sensor is a 3D camera.

3. The 3D sensor in accordance with claim 1, wherein the reference volume is a hazard zone that secures a machine.

4. The 3D sensor in accordance with claim 1, wherein the control and evaluation unit is implemented as an embedded system.

5. The 3D sensor in accordance with claim 1, wherein the control and evaluation unit reads a distance calculated in advance from an intermediate reference zone from the memory and determines the shortest distance from it.

6. The 3D sensor in accordance with claim 1, wherein the control and evaluation unit calculates shortest distances from the reference volume for different regions of the monitored zone and stores them in the memory.

7. The 3D sensor in accordance with claim 1, wherein discretization errors of the distances calculated in advance are underestimated such that inaccuracies only result in an underestimate of the shortest distance.

8. The 3D sensor in accordance with claim 1, wherein a respective set of distances calculated in advance is stored per reference volume.

9. The 3D sensor in accordance with claim 1, wherein additional information is stored on a distance calculated in advance in the memory that further characterizes a spacing or reference point from which there is a distance.

10. The 3D sensor in accordance with claim 1, wherein at least a subset of the distance or distances calculated in advance is stored relative to other distances calculated in advance.

11. The sensor in accordance with claim 1, wherein the part of the line of sight disposed behind it is a shadow volume from the grid element itself and from grid elements disposed therebehind in a direction of view of the 3D sensor.

12. The 3D sensor in accordance with claim 11,
wherein the shadow volume is boxed by a cylinder having semispheres at end sides for the determination of a distance calculated in advance.

13. A 3D sensor for monitoring a monitored zone wherein the 3D sensor comprises:
at least one light receiver for generating a received signal from received light from the monitored zone and
a control and evaluation unit having a memory, the control and evaluation unit detecting objects in the monitored zone by evaluating the received signal, determining the shortest distance of the detected objects from at least one reference volume, and reading at least one distance calculated in advance from the reference volume from a memory for the determination of the respective shortest distance of a detected object,
wherein reference volumes can be activated and distances calculated in advance from at least one combination of reference volumes active in parallel are compiled from distances calculated in advance per reference volume.

14. The 3D sensor in accordance with claim 13,
wherein the control and evaluation unit switches over to another combination of active reference volumes.

15. The sensor in accordance with claim 13,
wherein the part of the line of sight disposed behind it is a shadow volume from the grid element itself and from grid elements disposed therebehind in a direction of view of the 3D sensor.

16. The 3D sensor in accordance with claim 15,
wherein the shadow volume is boxed by a cylinder having semispheres at end sides for the determination of a distance calculated in advance.

17. The 3D sensor in accordance with claim 13,
wherein distances calculated in advance are stored in the memory in a 3D grid of the monitored zone.

18. The 3D sensor in accordance with claim 17,
wherein grid elements of the 3D grid become higher as the distance from the 3D sensor increases.

19. The sensor in accordance with claim 17,
wherein on a determination of a distance calculated in advance of a grid element of the 3D grid, the shortest distance is determined from a line of sight from the 3D sensor through the grid element itself and a part of the line of sight disposed behind it from a view of the 3D sensor.

20. A method of monitoring a monitored zone,
wherein a received signal is generated and evaluated from received light from the monitored zone for the optical 3D monitoring to detect objects in the monitored zone and to determine the shortest distance of the detected objects from at least one reference volume,
wherein distances calculated in advance are stored in a memory in a 3 D grid of the monitored zone,
wherein at least one distance calculated in advance from the reference volume is read from the memory for the determination of the respective shortest distance of a detected object,
and wherein on a determination of a distance calculated in advance of a grid element of the 3D grid, the shortest distance is determined from a line of sight from a 3D sensor through the grid element itself and a part of the line of sight disposed behind it from a view of the 3D sensor.

* * * * *